3,444,227
TRIMETHYLSILOXYALUMINUM DIHYDRIDE
AND METHOD OF PREPARATION
Charles B. Roberts, Midland, and Darell D. Toner, Sanford, Mich., assignors to The Dow Chemical Company, Midland, Mich., a corporation of Delaware
No Drawing. Filed July 24, 1967, Ser. No. 655,321
Int. Cl. C10m 1/54; D06m 15/00; C07f 5/06
U.S. Cl. 260—448                                      5 Claims

ABSTRACT OF THE DISCLOSURE

This invention relates to a new composition of matter, $H_2AlOSi(CH_3)_3$, and to a method for its preparation by reacting, in an inert solvent, substantially equimolar quantities of aluminum hydride diethyl etherate and trimethylsilanol at a temperature of between about minus 20° C. and 30° C. $H_2AlOSi(CH_3)_3$ finds utility as an intermediate to make inorganic Al-O-Al polymers, as an oil additive to increase viscosity and viscosity index and as a water repellant for cloth.

SUMMARY OF THE INVENTION

This invention relates to a new compound, trimethylsiloxyaluminum dihydride [$H_2AlOSi(CH_3)_3$], and to a method for its preparation by the reaction, in an inert solvent, of solvated aluminum hydride and trimethylsilanol.

It is an object of this invention, therefore, to provide to the art a new and useful compound. An additional object is to provide a method for the preparation of such novel compound. These and other objects and advantages of the present process will become apparent from a reading of the following detailed description.

It has now been discovered that aluminum hydride etherate may be reacted with trimethylsilanol in solution in an inert solvent and in an inert atmosphere at about room temperature and pressure to produce trimethylsiloxyaluminum dihydride and hydrogen.

DESCRIPTION OF THE PREFERRED EMBODIMENTS

In the process of this invention, aluminum hydride etherate is reacted with trimethylsilanol in an organic solvent which is inert to and a solvent for both of the reactants. Suitable solvents for the reaction include ethers such as diethyl ether, tetrahydrofuran, dioxane, dimethyl ether of ethylene glycol and the like. The concentration of reactants in the inert solvent can be as low as about 0.01 molar or as high as the solubility of the least soluble reactant in the particular solvent. Lower concentrations are undesirable in that unduly large equipment is required and it becomes uneconomical to remove and handle large volumes of solvent.

It is preferred to employ about stoichiometric quantities of aluminum hydride etherate and trimethylsilanol reactants. An excess of one or the other may be employd, however, without having any detrimental effect upon the reaction. In order to effectively control the reaction, however, it is preferred to add one reactant to the other in a dropwise manner over a substantial portion of the reaction time until the desired proportion of reactants are admixed.

The reactants, after contact in solution, react at a temperature from about minus 20° C. to about 30° C. It is usually most convenient, however, to conduct the reaction at or near room temperature and, while pressure above or below atmospheric may be employed, it is usually desirable to conduct the reaction at or near atmospheric pressure.

This rate of reaction varies somewhat with temperature and pressure but a reaction time of between about 30 minutes and about 1 hour is generally sufficient to insure complete conversion as indicated by a cessation of the evolution of hydrogen from the reaction mass.

Upon completion of the reaction, the solvent is separated by any suitable means, such as reduced pressure evaporation, from the crystalline product. The product thus obtained is a white crystalline solid which sublimes at 50° C. 1 mm. pressure, is soluble in diethyl ether and finds utility as an intermediate to make inorganic Al-O-Al polymers, as an oil additive to increase viscosity and viscosity index and as a water repellant for cloth.

The following examples are provided for the purpose of further illustrating the invention but are not to be construed as limiting the scope thereof.

Example 1

A 0.5 molar solution of trimethylsilanol in diethyl ether was added dropwise over a period of about 30 minutes to a 0.25 molar solution of aluminum hydride diethyl etherate in diethyl ether. During the addition, the temperature of the reaction mixture was maintained at about 0° C. After the addition of the trimethylsilanol was complete, the mixture was stirred for about 15 minutes at room temperature (25° C.). At the end of this period, hydrogen evolution had ceased and the diethyl ether solvent was removed by stripping under reduced pressure.

The residue was substantially pure unsolvated trimethylsiloxyaluminum dihydride in the form of solid, white crystals. The product was then purified by sublimation at 50° C. and a pressure of 1 mm. of mercury.

One portion of the trimethylsiloxyaluminum dihydride product thus prepared was used to impart water repellency to samples of wool and cotton cloth.

Another portion of such product was used to increase the viscosity of motor oil. A 2 gm. sample of the trimethylsiloxyaluminum hydride was admixed with an Amoco test oil. The viscosity of such treated oil at 100° F. was found to be 36.7 cps. compared to 35.5 cps. for the untreated oil. A second 2 gm. sample of trimethylsiloxyaluminum dihydride was added to a 200 gm. sample of Amoco test oil containing 6 gm. of ethyloleylorthophosphate. The viscosity of this oil mixture at 100° F. was found to be 118.9 cps. compared to 35.5 cps. for the same oil which did not contain the trimethylsiloxyaluminum dihydride.

Various modifications can be made in the present invention without departing from the spirit or scope thereof for it is understood that we limit ourselves only as defined in the appended claims.

We claim:
1. The compound $H_2AlOSi(CH_3)_3$.
2. A process for the preparation of $H_2AlOSi(CH_3)_3$ by the reaction in an inert solvent of substantially equimolar quantities of aluminum hydride diethyl etherate and trimethylsilanol at a temperature of between about minus 20° C. and about 30° C. for a time sufficient to achieve substantially complete conversion and separating the product from the inert solvent.

3. The process of claim 2 wherein the reaction temperature is about room temperature.

4. The process of claim 2 wherein the inert solvent is diethyl ether.

5. The process of claim 2 wherein the trimethylsilanol is added dropwise to the solution of aluminum hydride etherate solution.

References Cited

UNITED STATES PATENTS 2,567,972 9/1951 Schlesinger et al. _____ 23—14
2,897,220 7/1959 Jenkner _____ 260—448
3,184,418 5/1965 Woods et al. ____ 260—448 XR
3,254,104 5/1966 Ehrlich _____ 260—448

OTHER REFERENCES

Chemical Abstracts, vol. 65, p. 12290 (1966).
Chemical Abstracts, vol. 63, p. 18302 (1965).
Chemical Abstracts, vol. 59, p. 15300 (1963).

TOBIAS E. LEVOW, Primary Examiner.

H. M. S. SNEED, Assistant Examiner.

U.S. Cl. X.R.

260—2, 448.2; 252—8.6, 49.7